(12) United States Patent
Lehtiniemi et al.

(10) Patent No.: US 12,394,111 B2
(45) Date of Patent: Aug. 19, 2025

(54) VIRTUAL CONTENT

(71) Applicant: Nokia Technologies Oy, Espoo (FI)

(72) Inventors: Arto Juhani Lehtiniemi, Lempäälä (FI); Miikka Tapani Vilermo, Siuro (FI); Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 332 days.

(21) Appl. No.: 18/298,538

(22) Filed: Apr. 11, 2023

(65) Prior Publication Data
US 2023/0342989 A1    Oct. 26, 2023

(30) Foreign Application Priority Data
Apr. 26, 2022   (EP) .................................... 22170069

(51) Int. Cl.
*G06T 11/00* (2006.01)
*G06F 3/0346* (2013.01)
*G06T 7/73* (2017.01)

(52) U.S. Cl.
CPC ............ *G06T 11/00* (2013.01); *G06F 3/0346* (2013.01); *G06T 7/74* (2017.01)

(58) Field of Classification Search
None
See application file for complete search history.

(56) References Cited

U.S. PATENT DOCUMENTS

| 10,901,215 | B1 | 1/2021 | Newcombe et al. |
| 2019/0347846 | A1 | 11/2019 | Olson et al. |
| 2022/0335695 | A1* | 10/2022 | Bastov ................ G06F 3/04815 |

FOREIGN PATENT DOCUMENTS

EP    3680753 B1    1/2022

OTHER PUBLICATIONS

Extended European Search Report received for corresponding European Patent Application No. 22170069.3, dated Oct. 1, 10, 2022, 7 pages.

* cited by examiner

*Primary Examiner* — Yanna Wu
(74) *Attorney, Agent, or Firm* — Nokia Technologies Oy (57) ABSTRACT

Example embodiments are disclosed relating to virtual content. Example embodiments may involve providing video data for output to a user device, the video data representing a virtual scene comprising one or more virtual objects at respective locations in the virtual scene with which a user of the user device may interact during an interactive session. The interactive session may be paused and a resumption input may be received at a second time, subsequent to the first time, for unpausing the interactive session. Responsive to receiving the resumption input, it may be detected that interaction with a particular virtual object, with which the user has interacted prior to the interactive session being paused, is restricted due to physical properties of a real-world space in which the user is located at the second time. The virtual scene may be modified to permit interaction with the particular virtual object without the detected restriction.

20 Claims, 8 Drawing Sheets

VIRTUAL CONTENT

FIELD

Example embodiments relate to virtual content, for example outputting video content representing a virtual scene which may comprise one or more virtual objects with which a user can interact.

BACKGROUND

The term extended reality (XR) is sometimes used to refer to a range of technologies and methods involving virtual content which may be visual and/or aural content. Common examples are virtual reality (VR), augmented reality (AR) and mixed reality (MR). VR may refer to rendering a virtual scene in terms of video and/or audio content through a user device such as a VR headset or a handheld device, wherein the virtual scene may be updated based on user movement. AR is similar, but involves output of overlaid virtual content to augment a view of a real-world space seen through a user device such as glasses, goggles or even the camera of a handheld device. Thus, a user may be able to view the real-world environment around them, augmented or supplemented with virtual content that may be provided based on their position. The virtual content may comprise multimedia content such as pictures, photographs, video, diagrams, textual information and aural content, to give some examples. MR is similar to AR, but may be considered different in that some content is inserted into the real-world space at anchor points to give the illusion that the content is part of the real environment.

In some cases, a user may explore virtual content, e.g. a virtual scene, using six-degrees-of-freedom (6DoF) in which both rotational and translational movement of the user or user device allows the user to move around, e.g. behind, virtual objects in the scene.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus, comprising means for: providing video data for output to a user device, the video data representing a virtual scene comprising one or more virtual objects at respective locations in the virtual scene with which a user of the user device may interact during an interactive session; pausing the interactive session at a first time; receiving a resumption input at a second time, subsequent to the first time, for unpausing the interactive session; detecting, responsive to receiving the resumption input, that interaction with a particular virtual object, with which the user has interacted prior to the interactive session being paused, is restricted due to physical properties of a real-world space in which the user is located at the second time; and modifying the virtual scene to permit interaction with the particular virtual object without the detected restriction.

The detecting means may be configured to detect that interaction is restricted based on a position of the particular virtual object, when output to the user device, at least partially overlapping a position of a physical structure of the real-world space.

The detecting means may be configured to detect that interaction is restricted based on a position of the particular virtual object, when output to the user device, being within a predetermined distance of a position of a physical structure of the real-world space.

The detecting means may be configured to detect that interaction is restricted based on a position of a physical structure of the real-world space at least partially overlapping a straight path between a position of the user and a position of the particular virtual object, when output to the user device.

The modifying means may be configured to modify the position of the particular virtual object in the virtual scene so that there is no overlap with the physical structure of the real-world space.

The modifying means may be configured to modify the position of the particular virtual object in the virtual scene so that the modified position is greater than the predetermined distance from the position of the physical structure of the real-world space.

The modifying means may be configured to modify the position of the particular virtual object in the virtual scene so that there is no overlap of the position of the physical structure with a straight path between the position of the user and the modified position of the particular virtual object, when output to the user device.

The modifying may be temporary.

The apparatus may further comprise means for unpausing the interactive session after the modifying is performed.

The modifying means may be configured to provide an indicator in the virtual scene corresponding to a target position where the user should move to in the real-world space in order to permit interaction with the particular virtual object without the detected restriction, and the apparatus may further comprising a means for unpausing the interactive session when the user moves to the target position.

The indicator may comprise a further virtual object that the user is holding at the time the interactive session is paused, the further virtual object being used by the user to interact with the particular virtual object, and the means for providing the indicator may be configured to change the position of the further virtual object so that it is not held by the user and is displayed at a different position to permit interaction with the particular virtual object without the detected restriction.

The position of the further virtual object may be changed such that its position corresponds to the position at the time the interactive session was paused.

The apparatus may further comprise means for providing one or more new virtual objects in the virtual scene at location(s) which, if the user were to move to said location(s), would result in an interaction restriction due to physical properties of the real-world space.

The user device may comprise an XR headset including a display screen and a set of headphones.

According to a second aspect, there is described a method comprising: providing video data for output to a user device, the video data representing a virtual scene comprising one or more virtual objects at respective locations in the virtual scene with which a user of the user device may interact during an interactive session; pausing the interactive session at a first time; receiving a resumption input at a second time, subsequent to the first time, for unpausing the interactive session; detecting, responsive to receiving the resumption input, that interaction with a particular virtual object, with which the user has interacted prior to the interactive session being paused, is restricted due to physical properties of a real-world space in which the user is located at the second time; and modifying the virtual scene to permit interaction with the particular virtual object without the detected restriction.

Detecting that interaction is restricted may be based on a position of the particular virtual object, when output to the user device, at least partially overlapping a position of a physical structure of the real-world space.

Detect that interaction is restricted may be based on a position of the particular virtual object, when output to the user device, being within a predetermined distance of a position of a physical structure of the real-world space.

Detect that interaction is restricted may be based on a position of a physical structure of the real-world space at least partially overlapping a straight path between a position of the user and a position of the particular virtual object, when output to the user device.

Modifying the position of the particular virtual object in the virtual scene may be such that there is no overlap with the physical structure of the real-world space.

Modifying the position of the particular virtual object in the virtual scene may be such that the modified position is greater than the predetermined distance from the position of the physical structure of the real-world space.

Modifying the position of the particular virtual object in the virtual scene may be such that there is no overlap of the position of the physical structure with a straight path between the position of the user and the modified position of the particular virtual object, when output to the user device.

The modifying may be temporary.

The method may further comprise unpausing the interactive session after the modifying is performed.

An indicator may be provided in the virtual scene corresponding to a target position where the user should move to in the real-world space in order to permit interaction with the particular virtual object without the detected restriction, and the apparatus may further comprising a means for unpausing the interactive session when the user moves to the target position.

The indicator may comprise a further virtual object that the user is holding at the time the interactive session is paused, the further virtual object being used by the user to interact with the particular virtual object, and providing the indicator may comprise changing the position of the further virtual object so that it is not held by the user and is displayed at a different position to permit interaction with the particular virtual object without the detected restriction.

The position of the further virtual object may be changed such that its position corresponds to the position at the time the interactive session was paused.

Further, one or more new virtual objects may be provided in the virtual scene at location(s) which, if the user were to move to said location(s), would result in an interaction restriction due to physical properties of the real-world space.

According to a third aspect, there is provided a computer program product comprising a set of instructions which, when executed on an apparatus, is configured to cause the apparatus to carry out the method of any preceding method definition.

According to a fourth aspect, there is provided a non-transitory computer readable medium comprising program instructions stored thereon for performing a method, comprising: providing video data for output to a user device, the video data representing a virtual scene comprising one or more virtual objects at respective locations in the virtual scene with which a user of the user device may interact during an interactive session; pausing the interactive session at a first time; receiving a resumption input at a second time, subsequent to the first time, for unpausing the interactive session; detecting, responsive to receiving the resumption input, that interaction with a particular virtual object, with which the user has interacted prior to the interactive session being paused, is restricted due to physical properties of a real-world space in which the user is located at the second time; and modifying the virtual scene to permit interaction with the particular virtual object without the detected restriction.

The program instructions of the fourth aspect may also perform operations according to any preceding method definition of the second aspect.

According to a fifth aspect, there is provided an apparatus comprising: at least one processor; and at least one memory including computer program code which, when executed by the at least one processor, causes the apparatus to: provide video data for output to a user device, the video data representing a virtual scene comprising one or more virtual objects at respective locations in the virtual scene with which a user of the user device may interact during an interactive session; pause the interactive session at a first time; receive a resumption input at a second time, subsequent to the first time, for unpausing the interactive session; detecting, responsive to receiving the resumption input, that interaction with a particular virtual object, with which the user has interacted prior to the interactive session being paused, is restricted due to physical properties of a real-world space in which the user is located at the second time; and modify the virtual scene to permit interaction with the particular virtual object without the detected restriction.

The computer program code of the fifth aspect may also perform operations according to any preceding method definition of the second aspect.

BRIEF DESCRIPTION OF THE FIGURES

Example embodiments will now be described, by way of example only, with reference to the accompanying drawings, in which.

DETAILED DESCRIPTION

In the description and drawings, like reference numerals refer to like elements throughout.

Example embodiments relate to an apparatus, method and computer program for outputting (alternatively "rendering") virtual content. Virtual content may represent a virtual scene which may comprise video content and/or audio content.

Example embodiments are therefore related to the field of extended reality (XR) and example embodiments focus on, but are not limited to, the output of video content for a virtual scene in a virtual reality (VR) scenario. It will be appreciated that example embodiments may also be applicable to augmented reality (AR) and mixed reality (MR) scenarios and other forms of rich media presentation.

Users may consume virtual content by means of a VR display device. The VR display device may comprise a set of display screens for output of video content, and possibly a set of headphones, or equivalents such as earphones, earbuds or other forms of audio output transducers, for output of audio content.

The VR display device may comprise, for example, a head-mounted display (HMD) device which may incorporate both the set of display screens and possibly headphones or equivalent. Other user devices may be used, however, as will be appreciated.

Figure 1:
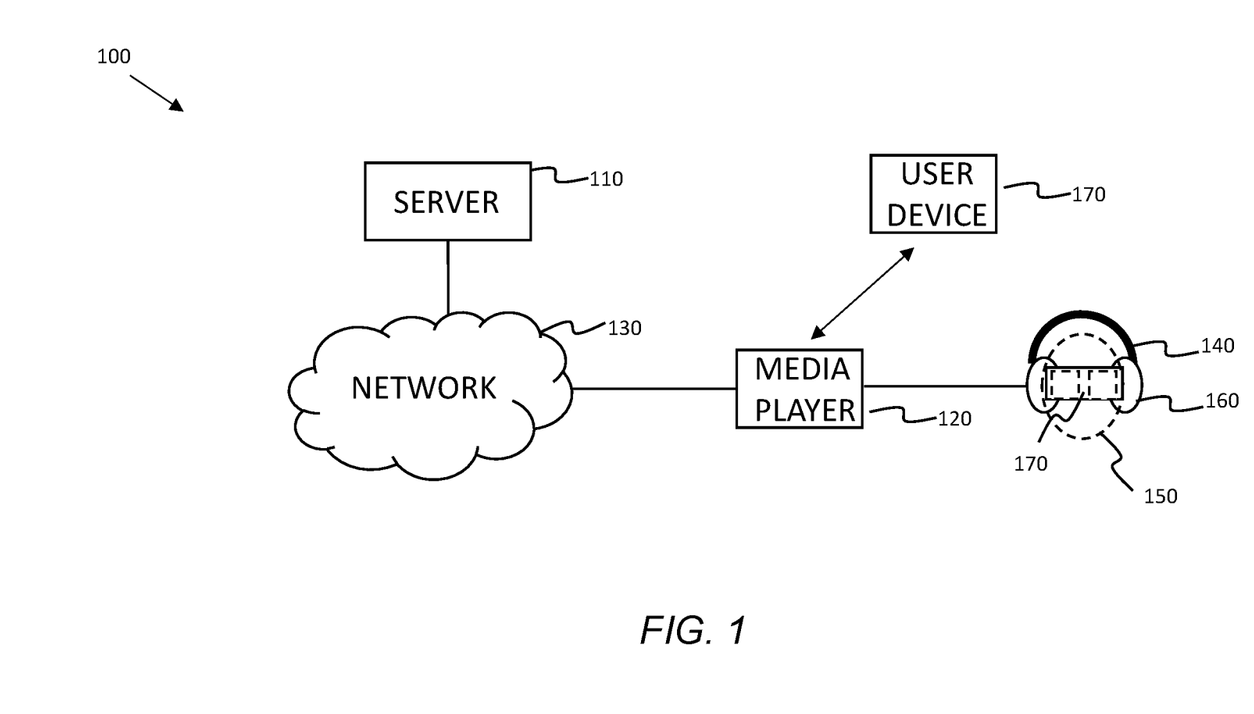
FIG. 1 is a block diagram of a system, which may be useful for understanding example embodiments.

FIG. 1 is a block diagram of a system 100 which may be useful for understanding example embodiments.

The system 100 may comprise a server 110, a media player 120, a network 130 and a VR display device 140 associated with a user 150. The VR display device 140 may also comprise a pair of headphones 160. A user device 170 associated with the user may also communicate with the media player 120. The user device 170 may comprise a smartphone or a smartwatch of the user 150 and/or a dedicated VR controller. The user device 170 may be used for user interaction with one or more interactive objects displayed as part of a virtual scene presented via the VR display device 140.

For example, the user device 170 may comprise one or more dedicated VR handsets which are used to determine a position of one or both of the user's hands with respect to the virtual scene. In this way, the user 150 may be able to select one or more virtual objects in the virtual scene or otherwise interact with them, such as by holding, picking-up, hitting or throwing virtual objects, to give some examples. The user device 170 is not however necessary for all interactions, which might otherwise be based on the position of the user 150, their gaze direction and/or by means of one or more sensors.

The server 110 may be connected to the media player 120 by means of the network 130 for sending data, e.g., a bitstream of data representing at least video data, to the media player 120. The server 110 may send the video data to the media player 120 responsive to one or more data requests sent by the media player 120. For example, the media player 120 may transmit to the server 110 an indication of the user's position, and the server may process and transmit back to the media player video data responsive to the received position, which may be performed in real-time or near real-time. This may be by means of any suitable streaming data protocol. Alternatively, or additionally, the server 110 may provide one or more files representing video data to the media player 120 for storage and processing thereat. At the media player 120, the audio data and video data may be processed, rendered and output to the VR display device 140.

The VR display device 140 may comprise one or more microphones for picking-up audio around the user 150, such as the user's voice. The VR display device 140 may be configured to transmit the audio to the media player 120 and/or to the user device 170 for processing. For example, the audio may represent a voice command that is processed by the media player 120 to perform a computer-related function.

In some embodiments, the media player 120 may comprise part of the VR display device 140. In other embodiments, the media player 120 may comprise a physically separate system such as a personal computer (PC), a laptop, a games console or a wearable computing device.

The network 130 may be any suitable data communications network including, for example, one or more of a radio access network (RAN) whereby communication is via one or more base stations, a WiFi network whereby communications is via one or more access points, or a short-range network such as one using the Bluetooth® or Zigbee protocol.

The user device 170 may communicate with the media player 120 or the VR display device 140 using any such network mentioned above.

In the context of this specification, a virtual scene is any computer-generated version of a space, for example a captured real world space, in which a user can be immersed, a computer-generated space, i.e. not captured, or a combination of both.

The FIG. 1 system 100 may include a means for determining the position of the user 150. Position may refer to the orientation and/or spatial position of the user 150.

This may be determined by means of determining the position of the VR display device 140. Over successive time frames, a measure of movement may therefore be calculated and stored. Such means may comprise part of the media player 120. Alternatively, or additionally, the means may comprise part of the VR display device 140.

For example, the VR display device 140 may incorporate motion tracking sensors which may include one or more of gyroscopes, accelerometers and structured light systems. These sensors generate position data from which a current visual field-of-view (FOV) is determined and updated as the user, and so the VR display device 140, changes position. The position data may represent measurements of pitch, roll and yaw and also translational movement in Euclidean space.

In this respect, it will be appreciated that the user 150 may explore the virtual scene using six-degrees-of-freedom (6DoF) in which both rotational and translational movement of the user or user device allows the user to move around, e.g. behind, virtual objects in the scene.

In use, the user 150 will view a virtual scene when located in a real-world space.

The real-world space may be indoors or outdoors and will have physical properties that the user 150 may or may not appreciate or understand when immersed in the virtual scene.

Physical properties may include one or more physical structures such as walls, doors, and/or windows. There may be objects such as furniture and/or other people. If a user 150 selects to pause viewing the virtual scene, which might occur automatically when the user removes the VR display device 140, or through some other input, they might later select to resume viewing the virtual scene at a different location and/or orientation.

For example, if the user views the virtual scene when located in a first real-world room, the different location when they resume viewing may be a different part of the first real-world room or a second, different, real-world room.

This may mean that new obstacles or structures may be present. It may mean that the user 150 is prevented or hindered from interacting with one or more virtual objects in the virtual scene, and/or that certain things, such as windows or other fragile objects, may get broken when the user interacts with the one or more virtual objects.

Figure 2:
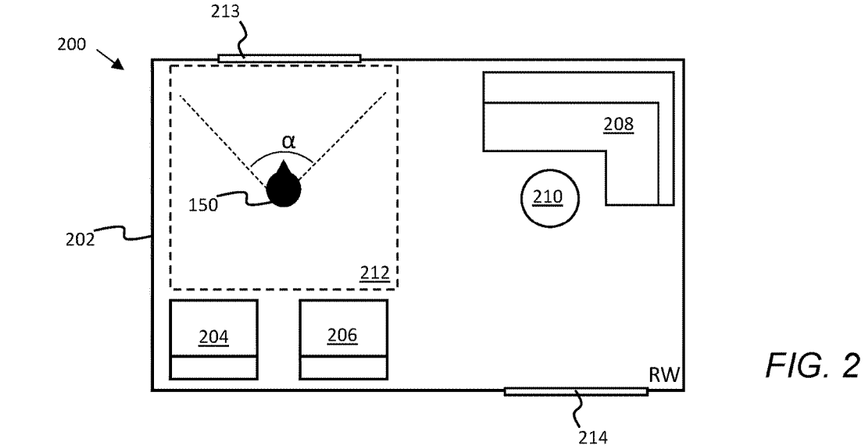
FIG. 2 is a plan view indicating a user positioned in a first real-world room when consuming a virtual scene through a VR display device at a first time.

For example, FIG. 2 is a plan view of a first scenario 200 in which the user 150 is positioned in a first real-world (RW) room (hereafter "first room") 202 when consuming a virtual scene through the VR display device 140 (not shown). The first room 202 comprises physical structures; for example, it is bounded by walls, and includes within the first room first and second chairs 204, 206, a corner sofa 208 and a footstool 210. First and second windows 213, 214 are provided in opposite walls. The dashed box 212 indicates the extent to which a virtual scene, e.g. part of an interactive game or experience, corresponds or overlaps with the floor area of the first room 202 when output to the VR display device 140. This dashed box 212 may be referred to as a "play area." The play area 212 is not necessarily square; it could be rectangular or another shape, for example. It will be seen that the user 150 may interact with one or more virtual objects in the virtual scene without interference with, or restriction due to, the above real-world physical structures. The angle α indicates a current viewport of the user 150.

Figure 3A:
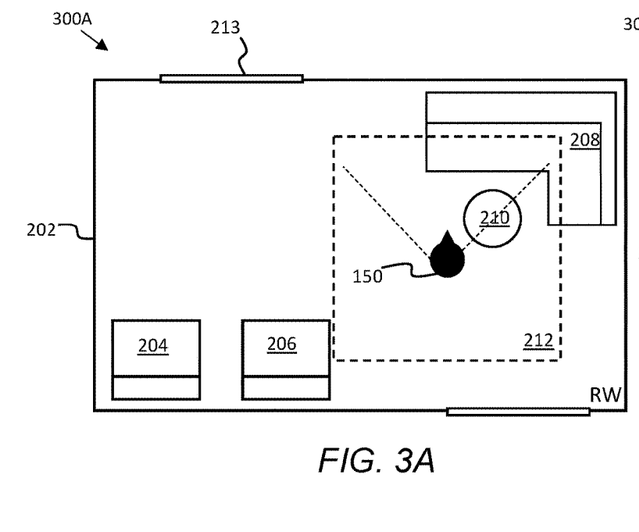
FIG. 3A is a plan view indicating the user positioned in the first real-world room at a later time.

FIG. 3A is a plan view of a subsequent scenario 300A after the user 150 has paused output of the virtual scene, for example to speak with someone, and then moved within the first room 202. The user 150 may then select to resume output of the virtual scene. It will be scene that part of the play area 212 now overlaps part of the corner sofa 208 and the footstool 210. There is the potential for the user's interaction with virtual objects in the virtual scene to be prevented, at least partly, and/or for physical damage to occur. For example, the virtual object(s) may overlap or be beyond, say, the corner sofa 208 and/or footstool 210. In either case, the user experience is non-optimal.

Figure 3B:
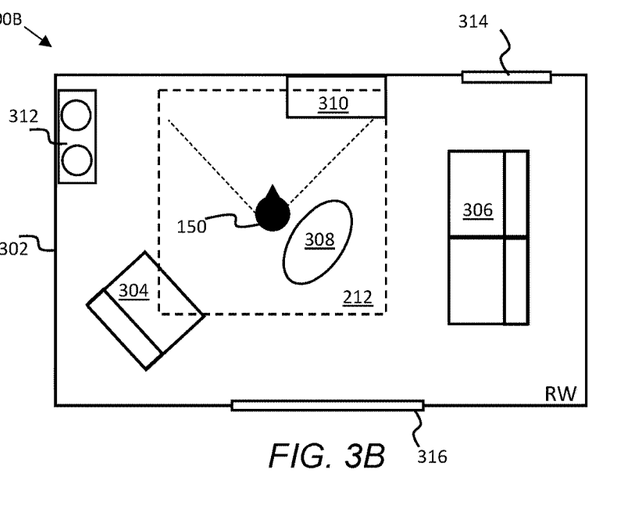
FIG. 3B is a plan view indicating the user positioned in a second real-world room at a later time.

FIG. 3B is a plan view of another subsequent scenario 300B after the user 150 has paused output of the virtual scene, moved from the first room 202 into a second room 302, and then selected to resume output of the virtual scene. The second real-world (RW) room (hereafter "second room") 302 comprises physical structures; it is again bounded by walls, and includes a first chair 304, a sofa 306, a rug 308, a sideboard 310 and a shelf 312 with objects thereon. First and second windows 314, 316 are provided in opposite walls. There is again the potential for the user's interaction with one or more virtual objects in the virtual scene to be prevented, at least partly, and/or for physical damage to occur, for similar reasons to the above.

Example embodiments are aimed at avoiding or alleviating such issues, providing an improved user experience and preventing damage and/or injury.

Figure 4:
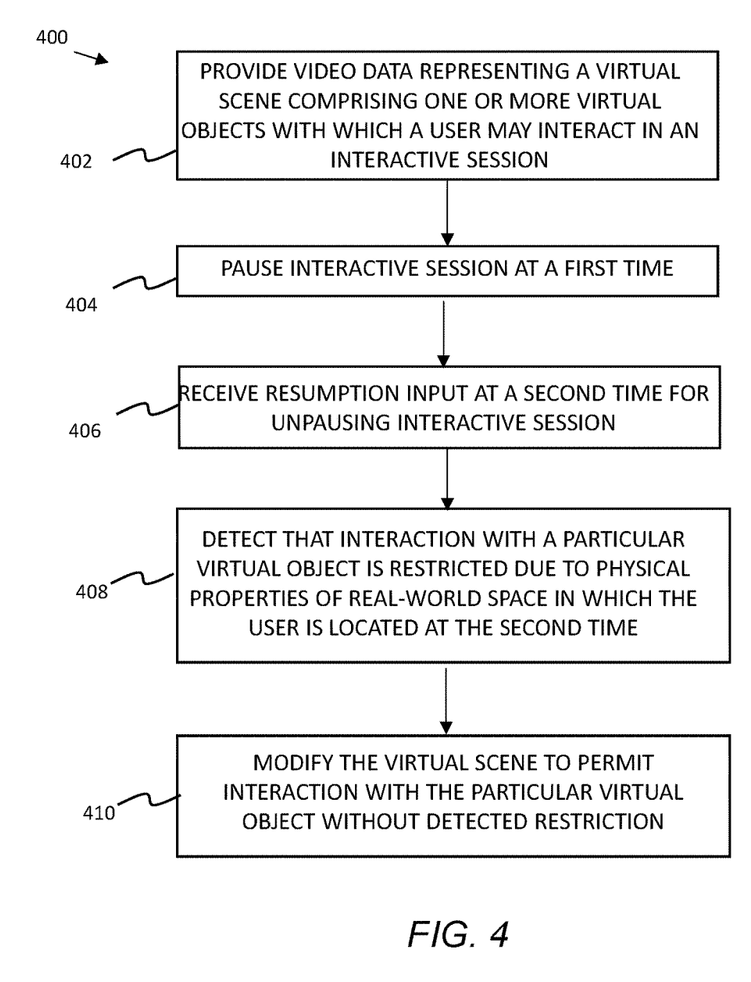
FIG. 4 is a flow diagram indicating operations according to one or more example embodiments.

FIG. 4 is a flow diagram showing processing operations, indicated generally by reference numeral 400, according to example embodiments. The processing operations 400 may be performed in hardware, software, firmware, or a combination thereof. For example, the processing operations may be performed by a rendering engine such as the media player 120 shown in FIG. 1.

A first operation 402 may comprise providing video data for output to a user device, the video data representing a virtual scene comprising one or more virtual objects, e.g. at respective locations in the virtual scene, with which a user of the user device may interact during an interactive session.

The term "providing" may mean "receiving", "generating", "rendering" or a combination thereof.

A second operation 404 may comprise pausing the interactive session at a first time.

A third operation 406 may comprise receiving a resumption input at a second time, subsequent to the first time, for unpausing the interactive session.

A fourth operation 408 may comprise detecting, e.g. responsive to receiving the resumption input, that interaction with a particular virtual object is restricted due to physical properties of a real-world space in which the user is located at the second time.

A fifth operation 410 may comprise modifying the virtual scene to permit interaction with the particular virtual object without the detected restriction.

Example embodiments may also provide an apparatus comprising means for performing the processing operations 400. The means may comprise at least one processor and at least one memory directly connected or coupled to the at least one processor. The at least one memory may include computer program code which, when executed by the at least one processor, may perform the processing operations 400 and any preferred features thereof described below.

In example embodiments, the second operation 404 may result from a user, e.g. the user 150 referred to above, removing or otherwise disabling their VR display device 140. Other ways of pausing an interactive session may be used.

An interactive session may be considered any form of virtual scene presentation in which a user may interact with one or more virtual objects.

Interaction may refer to physical interaction, including making some part of a virtual object change in terms of its position, form and/or appearance due to some virtualised part of the user, e.g. a virtualised representation of their hand, foot and/or something held in their hand, making contact with the virtual object in the virtual scene. For example, the user 150 may kick a virtual ball, pick-up a virtual object and/or hit a virtual object. Interaction may also refer to a virtual object interacting with the user in some way, e.g. by the virtual object moving to where the user is located. Interaction need not be physical, and in some cases may involve the virtual object speaking or playing other audio which can be heard by the user 150.

In example embodiments, the third operation 406 may result from the user 150 replacing or otherwise enabling their VR display device 140. Other ways of resuming an interactive session may be used.

Figure 5:
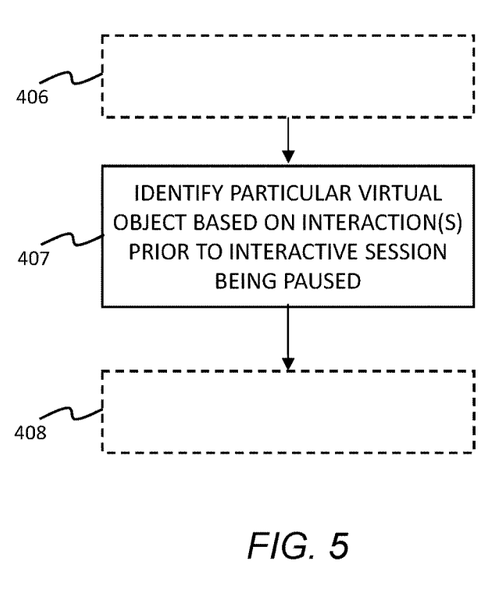
FIG. 5 is a flow diagram indicating further operations according to one or more example embodiments.

FIG. 5 is a flow diagram showing processing operations, indicated generally by reference numeral 500, which may be performed in order to identify the (one or more) virtual object(s) used in the fourth operation 408 of the FIG. 4 method. In this case, after the third operation 406, another operation 407 may comprise identifying the particular virtual object based on interaction(s) prior to the interactive session being paused. Thus, if a user has previously kicked a virtual ball, for example, that virtual ball is the particular virtual object considered in the fourth operation 408. This identifying operation 407 may, in theory, take place at any time between the second and fourth operations 404, 408

Additionally, or alternatively, this identifying operation 407 may identify the particular virtual object as one which will interact with the user 150 at, or after, the second time.

It can sometimes be predicted based on prior user actions, such as prior movements, that the user 150 will in the future interact with a particular virtual object. For example, the interactive session may involve a game requiring the user 150 to interact with a particular or predicable sequence of virtual objects, and what the user will interact with in the future is therefore straightforward to determine. The interactive session may be a role-playing activity in which the content creator has defined that one or more particular virtual objects will approach and interact with the user 150 at a future time.

With regard to the fourth operation 408, physical properties of the real-world space in which the user is located may be determined using one or more known methods.

For example, one or more rooms, such as the first and second rooms 202, 302, in which the user 150 will consume a virtual scene may be defined in terms of a data model. The data model may be provided as metadata in a file. The data model for a room may define its physical properties, e.g. its dimensions, the locations and/or sizes of physical structures of walls, windows and/or objects within the room. The nature of certain objects may also be defined, e.g. whether or not they are movable and/or breakable and/or what materials they are made of. Additionally, or alternatively, one or more cameras may be used, possibly as part of the system 100 shown in FIG. 1, for capturing and processing video data to produce a data model for a given room having the same or similar properties to the earlier example. The one or more cameras may provide a live or near-live version of a given room and its particular physical structures.

In some example embodiments, detecting that interaction with a particular virtual object is restricted may be based on a position of the particular virtual object, when output to the user device, e.g. the VR display device 140, at least partially overlapping a position of a physical structure of the real-world space. Examples will be described below. In this case, the fifth operation 410 may modify the position of the particular virtual object in the virtual scene so that there is no overlap with the physical structure of the real-world space.

Additionally or alternatively, in some example embodiments, detecting that interaction with a particular virtual object is restricted may be based on a position of the particular virtual object, when output to the VR display device 140, being within a predetermined distance of a position of a physical structure of the real-world space. For example, if the particular virtual object is within 5 centimetres of a wall, window or object in the real-world space, interaction may be considered restricted. In this case, the fifth operation 410 may modify the position of the particular virtual object in the virtual scene so that the modified position is greater than the predetermined distance from the position of the physical structure of the real-world space.

Additionally or alternatively, in some example embodiments, detecting that interaction with a particular virtual object is restricted may be based on a position of a physical structure of the real-world space at least partially overlapping a straight path between a position of the user and a position of the particular virtual object, when output to the VR display device 140. For example, if the particular virtual object is beyond or behind an object in the real-world space, interaction may be considered restricted. In this case, the fifth operation 410 may modify the position of the particular virtual object in the virtual scene so that there is no overlap of the position of the physical structure with a straight path between the position of the user and the modified position of the particular virtual object.

In of the above cases, the fifth operation 410 of modifying the virtual scene may be temporary. For example, if an interaction event involves performance of one or more tasks in relation to a particular virtual object, the modifying of the virtual scene may be reversed once the one or more tasks have been completed.

In some example embodiments, after the modifying has taken place, the resumption input may be acted upon and the interactive session is unpaused.

A number of example embodiments will now be described with reference to practical scenarios.

Figure 6:
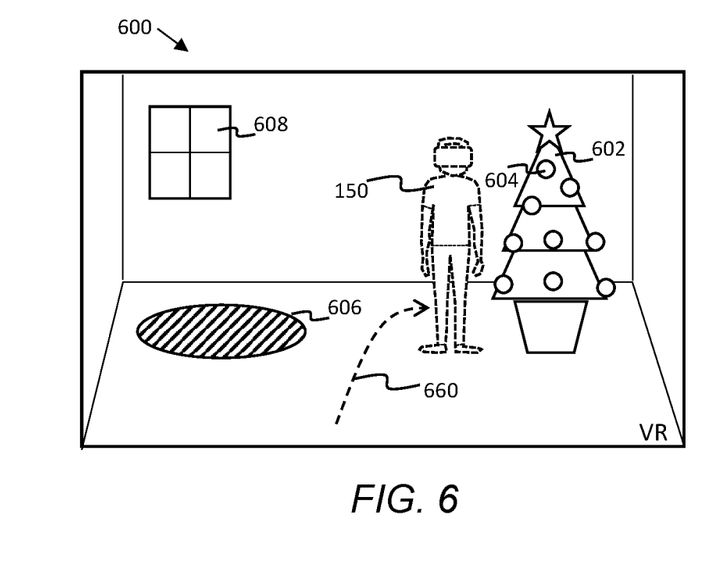
FIG. 6 is a perspective view a first virtual scene that the user may explore as part of an interactive session.

FIG. 6 is a perspective view of a first virtual scene 600 that the aforementioned user 150 may explore as part of an interactive session. The user's position in the first virtual scene 600 is shown in dashed line for illustrative purposes and the arrow 66o indicates that the user 150 may move in a translational way towards one or more virtual objects in the first virtual scene. The one or more virtual objects may include a Christmas tree 602 which carries one or more decorations 604. The one or more decorations 604 may be removable by user action, and hence are interactive objects. Other virtual objects include a rug 606 and a window 608 within the first virtual scene.

Figure 7:
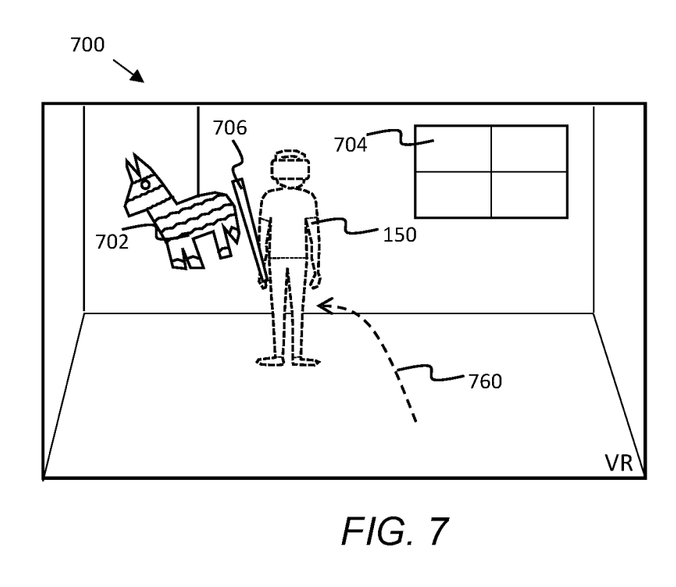
FIG. 7 is a perspective view a second virtual scene that the user may explore as part of an interactive session.

FIG. 7 is a perspective view of a second virtual scene 700 that the aforementioned user 150 may explore as part of an interactive session. As above, the user's position in the second virtual scene 700 is shown in dashed line for illustrative purposes and the arrow 760 indicates that the user may move in a translational way towards one or more virtual objects in the second virtual scene. The one or more virtual objects may include a piñata 702, a window 704 and a bat 706, the position of which is based on the location of the user's hand.

In use, the user 150 may strike the piñata 702 using the bat 706 as part of the interactive session.

Figure 8A:
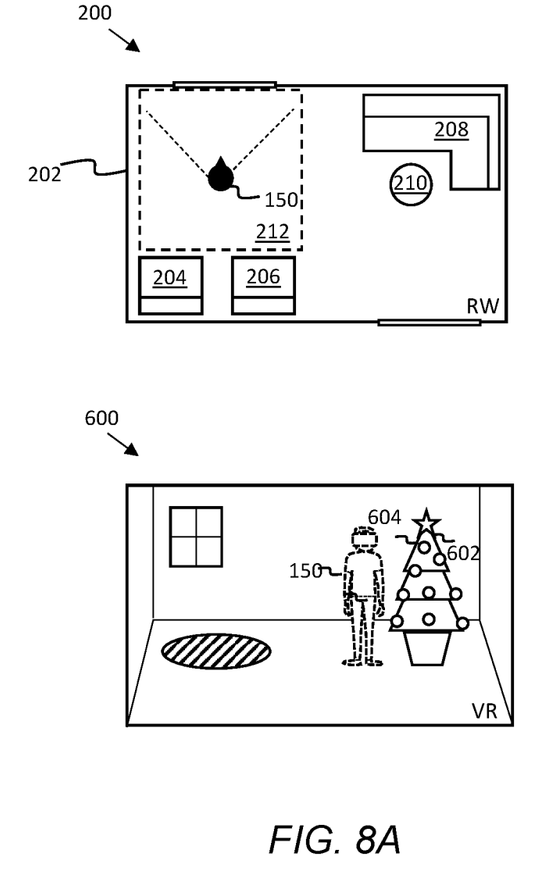
FIG. 8A shows plan and perspective views indicative of the user consuming the first virtual scene at a first time.

In one example, FIG. 8A shows the FIG. 2 first scenario 200 which shows, in the top section, the play area 212 for the user 150 within the first room 202 at a first time. The user 150 at the first time consumes the first virtual scene 600 of FIG. 6, shown in the bottom section, as part of an interactive session. For example, the user 150 may decide to remove the one or more decorations 604 from the Christmas tree 602.

The user 150 at some time may select to pause the interactive session. The one or more decorations 604 may be identified as particular virtual objects with which the user 150 has interacted and/or will interact with in the future.

Figure 8B:
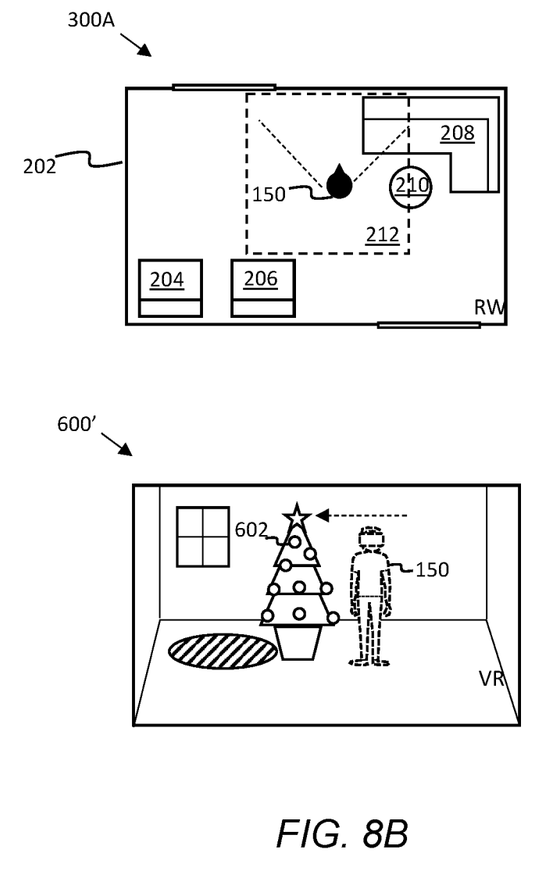
FIG. 8B shows plan and perspective views indicative of the user consuming the first virtual scene at a second time according to one or more example embodiments.

FIG. 8B shows the FIG. 3A scenario 300A which shows, in the top section, the play area 212 after the user 150 has made a resumption input at a second time. It will be seen that the user 150 has moved within the first room 202 and that the position of the Christmas tree 602 and the one or more decorations 604 now overlap the position of the corner sofa 208 and possibly the footstool 210. Interaction is restricted.

Accordingly, as shown in the bottom section, the position of the Christmas tree 602 and the one or more decorations 604 in a modified version 600' of the first virtual scene 600 is moved; in this case they are moved to a new position where interaction is no longer restricted, or is less restricted e.g. based on knowledge of the physical structure of the first room 202, so that the Christmas tree does not overlap a physical object such as the corner sofa 208 and footstool 210. Additionally, the new position may be greater than a predetermined distance from a physical structure, such as a wall or physical object, and/or there is no physical object between the user's current position and the new position.

The interactive session may then be automatically unpaused. If the modification is to be temporary, the modified version 600' may revert back to the original version of the first virtual scene 600. This may occur automatically when, for example, the user 150 has removed all decorations 604 from the Christmas tree 602.

Figure 9A:
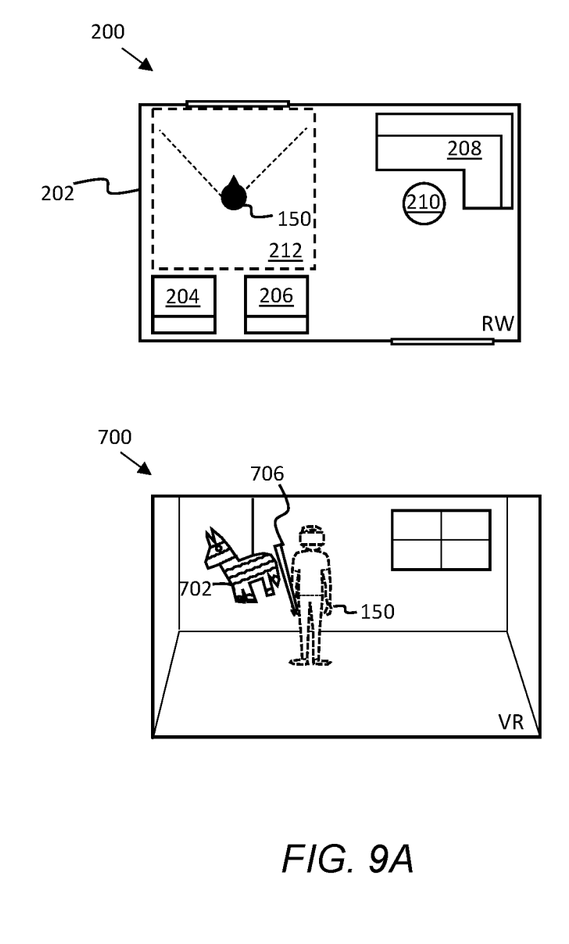
FIG. 9A shows plan and perspective views indicative of the user consuming the second virtual scene at a first time.

In another example, FIG. 9A shows the first scenario 200 which shows, in the top section, the play area 212 for the user 150 within the first room 202 at a first time. The user 150 at the first time consumes the second virtual scene 700 of FIG. 7, shown in the bottom section, as part of an interactive session. For example, the user 150 may decide to hit the piñata 702 with the bat 706.

The user 150 at some time may select to pause the interactive session. The piñata 702 may be identified as a particular virtual object with which the user 150 has interacted and/or will interact with in the future.

Figure 9B:
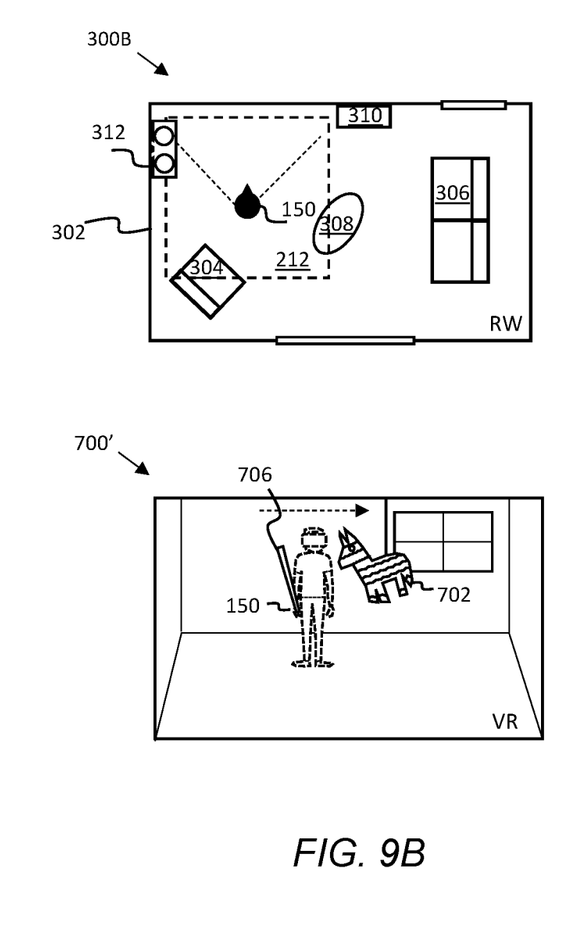
FIG. 9B shows plan and perspective views indicative of the user consuming the second virtual scene at a second time according to one or more other example embodiments.

FIG. 9B shows the FIG. 3B scenario 300B which shows, in the top section, the play area 212 after the user 150 has made a resumption input at a second time. It will be seen that the user 150 has moved to the second room 302 and that the position of the piñata 702 is now close to, i.e. within a predetermined distance of, the shelf 312 in the second room. This, possibly coupled with the knowledge that the type of interaction is a striking or hitting one, means that interaction is restricted because movement of the bat 706, e.g. by a swinging movement of the user's arm(s), may cause the user 150 to strike the shelf 312.

Accordingly, as shown in the bottom section, the position of the piñata 702 in a modified version 700' of the second virtual scene 700 is moved; in this case it is moved to a new position where interaction is no longer restricted, e.g. based on knowledge of the physical structure of the second room 302, so that the piñata 702 is greater than the predetermined distance from the shelf 312 and likely other physical objects or other structures. Additionally, there may be no physical object between the user's current position and the new position of the piñata 702.

The interactive session may then be automatically unpaused. If the modification is to be temporary, the modified version 700' may revert back to the original version of the second virtual scene 700. This may occur automatically when, for example, the user 150 has completely broken the piñata 702.

Figure 10A:
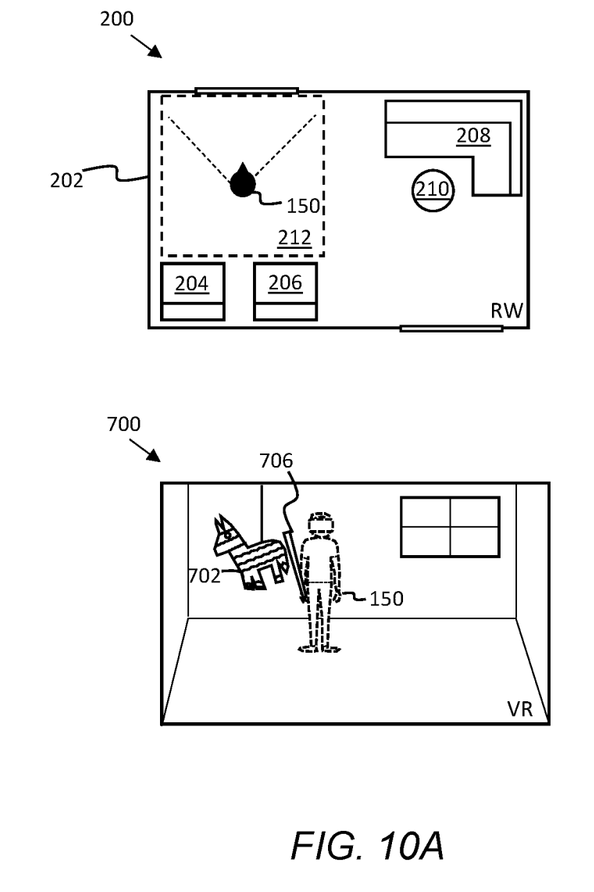
FIG. 10A shows plan and perspective views indicative of the user consuming the second virtual scene at a first time.

In another example, FIG. 10A shows the FIG. 2 first scenario 200 which shows, in the top section, the play area 212 for the user 150 within the first room 202 at a first time. The user 150 at the first time consumes the second virtual scene 700 of FIG. 6, shown in the bottom section, as part of the interactive session. For example, the user 150 may decide to hit the piñata 702 with the bat 706.

The user 150 at some time may select to pause the interactive session. The piñata 702 may be identified as a particular virtual object with which the user 150 has interacted and/or will interact with in the future.

Figure 10B:
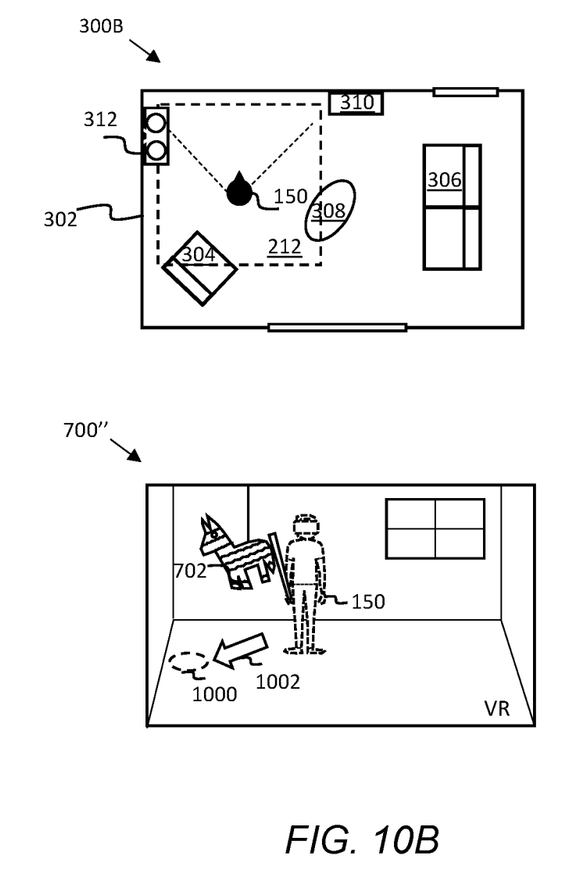
FIG. 10B shows plan and perspective views indicative of the user consuming the second virtual scene at a second time according to one or more example embodiments.

FIG. 10B shows the FIG. 3B later scenario 300B after the user 150 has made a resumption input at a second time. Similar to FIG. 9B, in the top section, the user 150 has moved to the second room 302 and the position of the piñata 702 is now close to, i.e. within a predetermined distance of, the shelf 312 in the second room. This, possibly coupled with the knowledge that the type of interaction is a striking or hitting one, means that interaction is restricted.

In this case, as shown in the bottom section, the position of the piñata 702 in not necessarily modified. Rather, in a modified version 700" of the second virtual scene, an indicator 1000 is provided in the virtual scene corresponding to a target position where the user 150 should move to in the second room 302 to permit interaction without restriction. An arrow 1002 may also be provided. The target position provided by the indicator 1000 may be one which avoids user interactions interfering with, in this case, the shelf 312 and possibly other physical structures.

When the user 150 reaches the target position provided by the indicator 1000, the interactive session may be automatically unpaused.

In some examples, it may be a further interactive object that provides the indicator 1000. For example, the further interactive object may be an object that is being held by the user 150 and/or otherwise used to interact with a particular interactive object. For example, following the above example, the position of the bat 706 may be changed so that it no longer corresponds to the current position of the user's hand. Rather, the position of the bat 706 may be moved to, and displayed at, a different position where no restriction occurs or will occur, e.g. due to the user moving their hand(s) or arm(s) to swing the bat. In cases where the user 150 moves within the same room between receipt of the pause and resumption inputs, the position of the bat 706 may be displayed upon receipt of the resumption input at its original position, i.e. the position at, or just prior to, receipt of the pause input.

In some example embodiments, where the user 150 is prompted in this way to change position, one or more new virtual objects may be provided in the virtual scene. The one or more new virtual objects may be provided at respective locations which, if the user 150 were to move to said locations, would result in an interaction restriction due to physical properties of the real-world space.

Taking the FIG. 10B example, one or more new virtual objects might be provided at respective positions corresponding to the previous position of the user 150 to deter him or her from returning to that position in the real-world space. In this way, the user 150 is given a visual cue as to which translational movements to avoid in order to continue with the interactive session. One or more other new virtual objects might be provided at all relevant locations whereby interaction might be restricted. For example, another new virtual object may be placed on the opposite side of the piñata 702 to the indicator 1000 to indicate to the user 150 which side they should strike it from.

Example embodiments may therefore provide a way of ensuring a more optimal user experience with little or no risk of injury and damage to property. The user 150 may experience a relatively smooth and seamless resumption of a paused interactive session with the same virtual objects being available for interaction.

In terms of where virtual objects and/or the user 150 is moved or guided to in terms of the modified virtual scene, this may be dictated by the content creator who, as part of the virtual content data, provides a set of one or more alternate positions which may be used in the event of a restriction for a given position with respect to the current virtual scene. Multiple alternative positions may be provided and the selection of which position to choose may be based on, for example, the type of interaction (e.g. a striking or hitting interaction, a speaking interaction, a lifting or moving interaction, the speed of interaction etc.) and/or the type of virtual scene. The content creator may provide this information as metadata, for example as part of a file. The Moving Pictures Experts Group (MPEG) is developing a standard for immersive applications, known as MPEG-I, which intends to provide an encoder input format (EIF) file which describes the structure and representation of virtual scenes, and which could be adapted to provide alternative position metadata.

In some example embodiments, the system 100 may be configured to identify a better play area based on the virtual scene. If, for example, the current play area is considered unsuitable because there are insufficient alternate positions where an interactive object can be moved to and/or the user can be moved to due to physical properties of the room, the system 100 may identify and propose an alternative play area in terms of a shift within the current room or moving to a different room, assuming the physical properties of the current and different room is or are available. If the user 150 does not accept the proposal, and attempts to resume the interaction session outside of the alternate play area, they may again be guided to the proposed alternative play area.

In some example embodiments, there may be two or more users 150 involved in a multi-user interactive session, each wearing a VR display device 140 and being co-located in the same room. In this case, the above described metrics as to where to move objects and/or users may be based on information from both users 150, for example their respective positions, what they have interacted with and/or will interactive with in the future.

Figure 11:
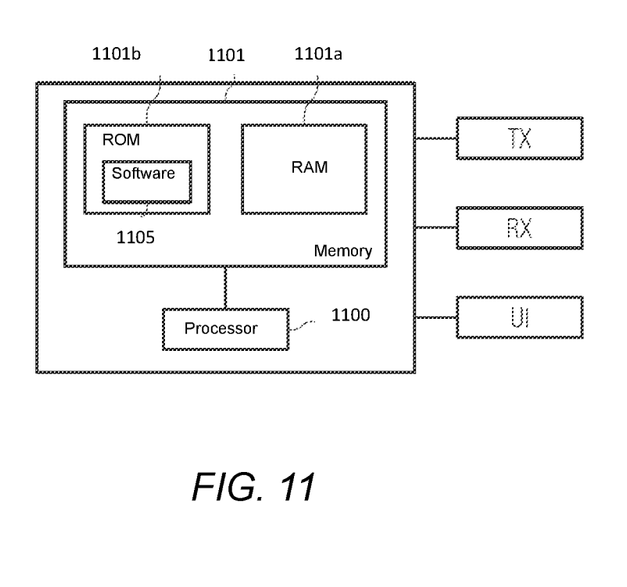
FIG. 11 shows an apparatus according to one or more example embodiments.

FIG. 11 shows an apparatus according to an embodiment, which may comprise the media player 120 as described herein. The apparatus may be configured to perform the operations described herein, for example operations described with reference to any preceding process.

The apparatus comprises at least one processor 1100 and at least one memory 1101 directly or closely connected to the processor. The memory 1101 includes at least one random access memory (RAM) nom and at least one read-only memory (ROM) 1101b. Computer program code (software) 1105 is stored in the ROM 1101b. The apparatus may be connected to a transmitter (TX) and a receiver (RX). The apparatus may, optionally, be connected with a user interface (UI) for instructing the apparatus and/or for outputting data. The at least one processor 1100, with the at least one memory 1101 and the computer program code 1105 are arranged to cause the apparatus to at least perform at least the method according to any preceding process. The at least one processor 1100 may be in communication with the VR display device 140 described herein.

Figure 12:
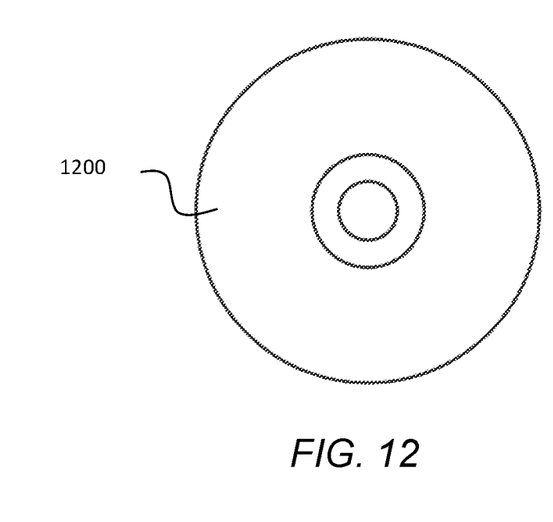
FIG. 12 shows a non-transitory medium for storing computer-readable code or instructions which, when executed by the FIG. 11 apparatus, may perform processing operations described herein according to one or more example embodiments.

FIG. 12 shows a non-transitory medium 1200 according to some embodiments. The non-transitory medium 1200 is a computer readable storage medium. It may be e.g. a CD, a DVD, a USB stick, a blue ray disk, etc. The non-transitory medium 1200 stores computer program code, causing an apparatus to perform the method of any preceding process.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

As disclosed herein, a reference to "means" may comprise at least one processor; and at least one memory including computer program code, the at least one memory and computer program code configured to, with the at least one processor, cause the performance of one or more operations of the means. A means may also comprise circuitry, hardware, software, firmware or a combination thereof.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:
   at least one processor; and
   at least one memory storing instructions that, when executed by the at least one processor, cause the apparatus at least to:
   provide video data for output to a user device, the video data representing a virtual scene comprising one or more virtual objects at respective locations in the virtual scene with which a user of the user device may interact during an interactive session;
   pause the interactive session at a first time;
   receive a resumption input at a second time, subsequent to the first time, for unpausing the interactive session;
   detect, responsive to receiving the resumption input, that interaction with a particular virtual object, with which the user has interacted prior to the interactive session being paused, is restricted due to physical properties of a real-world space in which the user is located at the second time; and
   modify the virtual scene to permit interaction with the particular virtual object without the detected restriction.

2. The apparatus of claim 1, wherein the apparatus is configured to detect that interaction is restricted based on a position of the particular virtual object, when output to the user device, at least partially overlapping a position of a physical structure of the real-world space.

3. The apparatus of claim 1, wherein the apparatus is configured to detect that interaction is restricted based on a position of the particular virtual object, when output to the user device, being within a predetermined distance of a position of a physical structure of the real-world space.

4. The apparatus of claim 1, wherein the apparatus is configured to detect that interaction is restricted based on a position of a physical structure of the real-world space at least partially overlapping a straight path between a position of the user and a position of the particular virtual object, when output to the user device.

5. The apparatus of claim 2, wherein the apparatus is configured to modify the position of the particular virtual object in the virtual scene so that there is no overlap with the physical structure of the real-world space.

6. The apparatus of claim 3, wherein the apparatus is configured to modify the position of the particular virtual object in the virtual scene so that the modified position is greater than the predetermined distance from the position of the physical structure of the real-world space.

7. The apparatus of claim 4, wherein the apparatus is configured to modify the position of the particular virtual object in the virtual scene so that there is no overlap of the position of the physical structure with a straight path between the position of the user and the modified position of the particular virtual object, when output to the user device.

8. The apparatus of claim 1, further caused to unpause the interactive session after the modifying is performed.

9. The apparatus of claim 1, wherein the apparatus is configured to provide an indicator in the virtual scene corresponding to a target position where the user should move to in the real-world space in order to permit interaction with the particular virtual object without the detected restriction, the apparatus further caused to unpause the interactive session when the user moves to the target position.

10. The apparatus of claim 9, wherein the indicator comprises a further virtual object being used by the user to interact with the particular virtual object, the apparatus is caused to change the position of the further virtual object so that it is displayed at a different position to permit interaction with the particular virtual object without the detected restriction.

11. The apparatus of claim 10, wherein the position of the further virtual object is changed such that its position corresponds to the position at the time the interactive session was paused.

12. The apparatus of claim 9, further caused to provide one or more new virtual objects in the virtual scene at location(s) which, if the user were to move to said location(s), would result in an interaction restriction due to physical properties of the real-world space.

13. An method, comprising:
providing video data for output to a user device, the video data representing a virtual scene comprising one or more virtual objects at respective locations in the virtual scene with which a user of the user device may interact during an interactive session;
pausing the interactive session at a first time;
receiving a resumption input at a second time, subsequent to the first time, for unpausing the interactive session;
detecting, responsive to receiving the resumption input, that interaction with a particular virtual object, with which the user has interacted prior to the interactive session being paused, is restricted due to physical properties of a real-world space in which the user is located at the second time; and
modifying the virtual scene to permit interaction with the particular virtual object without the detected restriction.

14. The apparatus of claim 13, wherein the detecting interaction is restricted based on a position of the particular virtual object, when output to the user device, at least partially overlapping a position of a physical structure of the real-world space.

15. The apparatus of claim 13, wherein the detecting interaction is restricted based on a position of the particular virtual object, when output to the user device, being within a predetermined distance of a position of a physical structure of the real-world space.

16. The apparatus of claim 13, wherein the detecting interaction is restricted based on a position of a physical structure of the real-world space at least partially overlapping a straight path between a position of the user and a position of the particular virtual object, when output to the user device.

17. The apparatus of claim 14, wherein the modifying comprises modifying the position of the particular virtual object in the virtual scene so that there is no overlap with the physical structure of the real-world space.

18. The apparatus of claim 15, wherein the modifying comprises modifying the position of the particular virtual object in the virtual scene so that the modified position is greater than the predetermined distance from the position of the physical structure of the real-world space.

19. The apparatus of claim 16, wherein the modifying comprises modifying the position of the particular virtual object in the virtual scene so that there is no overlap of the position of the physical structure with a straight path between the position of the user and the modified position of the particular virtual object, when output to the user device.

20. A non-transitory computer readable medium comprising program instructions stored thereon for performing at least the following:
providing video data for output to a user device, the video data representing a virtual scene comprising one or more virtual objects at respective locations in the virtual scene with which a user of the user device may interact during an interactive session;
pausing the interactive session at a first time;
receiving a resumption input at a second time, subsequent to the first time, for unpausing the interactive session;
detecting, responsive to receiving the resumption input, that interaction with a particular virtual object, with which the user has interacted prior to the interactive session being paused, is restricted due to physical properties of a real-world space in which the user is located at the second time; and
modifying the virtual scene to permit interaction with the particular virtual object without the detected restriction.

* * * * *